United States Patent [19]

Restaino et al.

[11] 3,841,401
[45] Oct. 15, 1974

[54] PROCESS FOR RECOVERING HYDROCARBON USING POLYMER OBTAINED BY RADIATION POLYMERIZATION

[75] Inventors: Alfred J. Restaino; William W. Bristowe, both of Wilmington, Del.

[73] Assignee: ICI America Inc., Wilmington, Del.

[22] Filed: Nov. 6, 1972

[21] Appl. No.: 303,739

[52] U.S. Cl. .............. 166/247, 166/273, 166/275, 252/8.55 D
[51] Int. Cl. .............................................. E21b 43/22
[58] Field of Search ....................... 166/273–275, 166/305 R, 247; 252/8.55 D, 8.55 R

[56] References Cited
UNITED STATES PATENTS

| | | | |
|---|---|---|---|
| 2,827,964 | 3/1958 | Sandiford et al. | 166/274 |
| 3,002,960 | 10/1961 | Kolodny | 252/8.55 D X |
| 3,020,953 | 2/1962 | Zerweck et al. | 166/274 |
| 3,025,237 | 3/1962 | Roper | 252/8.55 D |
| 3,039,529 | 6/1962 | McKennon | 166/275 |
| 3,070,158 | 12/1962 | Roper et al. | 166/275 |
| 3,208,518 | 9/1965 | Patton | 166/275 X |
| 3,367,418 | 2/1968 | Routson | 166/274 |
| 3,400,761 | 9/1968 | Latimer, Jr. et al. | 166/274 |
| 3,543,855 | 12/1970 | Blatz et al. | 166/274 |

FOREIGN PATENTS OR APPLICATIONS

| | | | |
|---|---|---|---|
| 683,476 | 3/1964 | Canada | 166/275 |

*Primary Examiner*—Stephen J. Novosad
*Attorney, Agent, or Firm*—Joseph C. Herring; Richard C. Willson, Jr.; Jack L. Hummel

[57] ABSTRACT

Improved waterflooding of an oil-bearing subterranean reservoir is obtained by flooding with a water-soluble polymer obtained as a product of radiation-induced polymerization of acrylamide and/or methacrylamide and acrylic acid, methacrylic acid, and/or alkali metal salts thereof. The polymerization is preferably carried out in 10–60 percent aqueous monomer solution with gamma radiation. The mixture of monomers, before radiation, preferably contains 25–99 percent acrylamide and 75–1 percent sodium acrylate. Such polymers are useful as mobility and/or viscosity control agents. A miscible or miscible-like displacing slug can precede injection of the polymer.

16 Claims, 3 Drawing Figures

PROCESS FOR RECOVERING HYDROCARBON USING POLYMER OBTAINED BY RADIATION POLYMERIZATION

BACKGROUND OF THE INVENTION

1. Field of the Invention

This invention relates to oil recovery processes, preferably secondary and tertiary oil recovery processes, wherein an aqueous solution of a mobility and/or viscosity control agent is injected into a subterranean reservoir and displaced toward a production well to recover crude oil therethrough. The agent is a polymer obtained from radiation polymerization of defined ethylenically unsaturated monomers.

2. Description of the Prior Art

It is known that certain water-soluble high molecular weight polymers impart improved mobility control to waterflooding processes. Mobility control is obtained by reducing the permeability of the reservoir rock and/or imparting viscosity control to the flooding process. One of the earliest teachings of flooding with water-soluble polymers is U.S. Pat. No. 2,341,500 to Detling. Beeson in U.S. Pat. No. 2,771,138 teaches flooding with naturally occurring gums, copolymers of methyl vinyl ether and maleic anhydride, condensation products of fatty acids, and hydroxy amines, sodium polyacrylate, polyacrylic acid, and poly (sodium methacrylate). Engelhardt et al. in U.S. Pat. No. 2,842,492 obtained improved waterflooding using copolymers of ethylenically unsaturated carboxylic acid and at least one ethylenically unsaturated noncarboxylic compound, the calcium salt of the copolymer being water-soluble. U.S. Pat. No. 3,002,960 to Kolodny teaches improved waterflooding with copolymers of acrylamide and acrylic acid wherein the intrinsic viscosities of the copolymers are at least 12 and preferably greater than 18. Zerweck et al. in U.S. Pat. No. 3,020,953 uses a polyacrylic acid amide to obtain improved waterflooding.

Alcohol adducts of copolymers of vinyl aromatic and maleic anhydride are useful in waterflooding, U.S. Pat. No. 3,025,237 to Roper. Also, Roper in U.S. Pat. No. 3,025,237 and 3,070,158 states that the prior art suggests copolymers of acrylamide-acrylic acid for improved waterflooding. Morgan in U.S. Pat. No. 2,775,557 teaches copolymers of acrylic acid and acrylamide are useful as partially hydrolyzed polyacrylamides to impart fluid loss control properties to drilling muds. Siegel et al. in Canadian Pat. No. 683,476 teach that radiation polymerized acrylamide may be used as an oil field floodwater additive.

Partially hydrolyzed high molecular weight polyacrylamides are used commercially as mobility and viscosity control agents in waterflooding processes. Sandiford et al. in U.S. Pat. No. 2,827,964 teach that 0.8-10 percent of the original amide groups in a polyacrylamide can be hydrolyzed to carboxyl groups to obtain such polymers—the polyacrylamide can contain up to 15 percent by weight of other polymerizable vinyl compounds. McKennon in U.S. Pat. No. 3,039,529 teaches that "hydrolyzed polyacrylamide having from 12-67 percent of the original carboxy-amide groups hydrolyzed to carboxyl groups" are useful to impart improved waterflooding characteristics. The McKennon polyacrylamides to be hydrolyzed can contain up to 10 percent by weight of a polymerizable vinyl compound.

SUMMARY OF THE INVENTION

Applicants have discovered that improved mobility control in oil recovery processes, preferably secondary and tertiary oil recovery processes, may be obtained using an aqueous solution of a water-soluble polymer obtained by radiation polymerization of acrylamide and/or methacrylamide and acrylic acid, methacrylic acid and/or alkali metal salts thereof. The aqueous solution to be polymerized may contain about 10–60 percent by weight of monomer. A preferred mixture of monomers contains 25–99 percent acrylamide and 75–1 percent by weight, based on the total weight of monomer, of sodium acrylate. Radiation intensity is 250–1,000,000 rads/hr., and the dosage is 500–300,000 rads. The reaction product may be diluted with water and used directly, or the polymer can be extracted from the reaction product, dried and thereafter solubilized. Improved injectivity indexes are also realized by aqueous solutions of these polymers when compared to equivalent molecular weight prior art polymers.

PREFERRED EMBODIMENTS OF THE INVENTION

Figure 1:
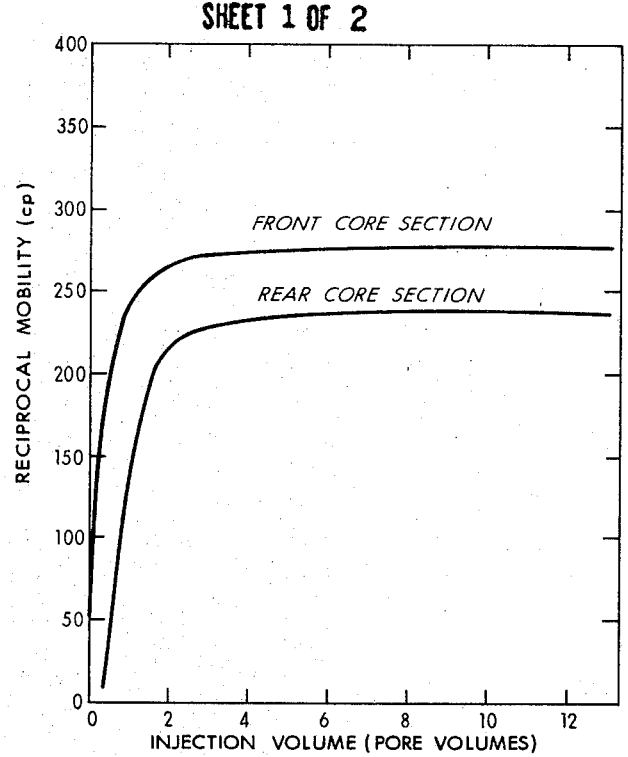
FIGS. 1 and 2 graphically illustrate the results of polymer flooding in 500–1500 md sandstone cores.

The monomer is a combination of at least one compound selected from the group consisting of acrylamide and methacrylamide and at least one compound selected from the group consisting of acrylic acid, methacrylic acid, alkali metal acrylate, and alkali metal methacrylate. Small amounts of additional ethylenically unsaturated copolymerizable monomers may also be used. Preferably, the monomer is a mixture of acrylamide and sodium acrylate. It is preferred that the monomer contain about 1–75 percent and preferably 15–55 percent and more preferably 20–50 percent of acrylic acid or alkali metal salt thereof, e.g., sodium acrylate.

Irradiation of the monomer is preferably carried out in an aqueous solution containing about 10 percent to about 60 percent and more preferably about 15 percent to about 45 percent by weight of dissolved monomer. At the lower concentrations of monomer, the product is generally a pourable polymer solution and at concentrations of above about 15 percent by weight, the product is generally a nonpourable gel. A water-insoluble product may result at concentrations of above about 60 percent monomer; thus, such high concentrations are undesirable. Of course, the particular limits of monomer concentration will depend, among other things, on the radiation conditions used, monomers used, and on the desired product for a particular use. The intrinsic viscosity of the polymer product increases as the monomer concentration increases, up to the point where the amount of cross-linking becomes appreciable, provided all other variables are kept constant.

The aqueous monomer solution preferably should not contain more than about 5 ppm of transition metal ions, such as nickel, iron, and cobalt, and no more than about 0.5 ppm of cuprous and cupric ions.

Irradiation of the aqueous monomer solution may be accomplished with high energy ionizing radiation. The radiation used has a wavelength below 3,500 Angstroms and preferably below 2,000 Angstroms. The radiation employed may be particulate or electromagnetic in nature. Examples include accelerated electrons, protons, neutrons, etc. as well as X-rays and gamma-rays, the latter being preferred.

Radiation intensity is preferably about 1,000 to about 300,000 rads/hr. and more preferably about 5,000 to about 200,000 rads/hr. Intensity directly influences the molecular weight of the copolymer. That is, under otherwise identical conditions, low intensities generally give higher molecular weights.

The radiation dose is preferably at least about 1,000 rads and more preferably at least about 1,500 rads. The maximum dose level is preferably not more than 100,000 rads and more preferably not more than 50,000 rads.

The radiation dose used directly influences the intrinsic viscosity and degree of monomer to polymer conversion. At a given radiation intensity and monomer concentration, an increase in radiation dose generally tends to result in a decrease in the intrinsic viscosity of the polymer produced and an increase in the degree of monomer to polymer conversion. The radiation dose may also influence the water-solubility of the polymer as it has been found that too high radiation dose may render the resulting polymer water-insoluble. At the preferred dosage rates, conversion up to about 100 percent and preferably 80–100 percent of the monomer to polymer may be obtained without undue insolubilization.

The pH of the aqueous monomer solution is generally not critical except very low pH values may cause insoluble products to form. Preferably the pH is within the range of 3–13 and more preferably about 8 to about 11. Although higher and lower pH values may be used, it should be recognized that hydrolysis tends to occur at pH values much below about 3 and much above about 11.

While the process described above may be used to prepare polymers having an intrinsic viscosity from about 6 to about 30 deciliters per gram in 2 normal sodium chloride at 25.5°C., the process is modified somewhat to prepare polymers having an intrinsic viscosity below about 6 deciliters per gram or above about 30 deciliters per gram in 2 normal sodium chloride at 25.5°C. Polymers having an intrinsic viscosity below about 6 deciliters per gram are prepared by carrying out the polymerization reaction described above in the presence of a chain transfer agent. The chain transfer agent tends to restrict the growth of active polymer chains and thereby results in the formation of polymers having lower molecular weight and lower intrinsic viscosity. The chain transfer agents which may be used herein may be any chain transfer agent which tends to restrict the growth of the polymer chains and thereby aid the formation of lower molecular weight and lower intrinsic viscosity polymers and which is soluble in the reaction medium. Illustrative examples of chain transfer agents which may be used include lower alkyl alcohols, such as methanol, ethanol, and isopropanol; halogenated compounds, such as trichloroacetic acid; thiosorbitols containing two thio groups and four secondary hydroxyl groups; and mercaptans. The amount of chain transfer agent used depends upon the intrinsic viscosity desired, the monomer concentration, and the chain transfer constant of the chain transfer agent used. The use of a chain transfer agent is not necessary in order to prepare polymers having intrinsic viscosities from about 6 to about 30 deciliters per gram; but if desired, such polymers may be prepared in the presence of chain transfer agents.

In order to prepare polymers having an intrinsic viscosity above about 30 deciliters per gram, the polymerization reaction is terminated when less than about 75 percent and preferably when less than about 60 percent by weight of the monomer has been converted to polymer. It has been found that the intrinsic viscosity of the resulting polymer tends to decrease as the percent of conversion of monomer to polymer increases. For reasons of economy, it is not practical to have conversions lower than about 20 percent.

The variables of radiation intensity, total radiation dose, and monomer concentration discussed above are interdependent variables. While useful polymers may be prepared at all monomer concentrations, radiation intensities, and radiation dosages within the ranges given heretofore, all combinations of concentration, dose, and intensity within these ranges may not be used to prepare polymers useful in the process of this invention. For example, while a polymer useful in the process of this invention may be prepared at a monomer concentration of 60 percent by weight, provided the radiation dose used is sufficiently low to result in the formation of water-soluble polymers, the use of a monomer concentration of 60 percent by weight, an intensity of 250 rads per hour, and a dose of 300,000 rads, results in the formation of water-insoluble polymers. In view of this interdependency of intensity, dose, and monomer concentration, it may be necessary to perform a limited amount of experimentation in order to prepare a polymer having the desired intrinsic viscosity. However, this experimentation may be kept to a minimum in view of the disclosure in Table 1 below of the preparation of a variety of polymers of different viscosities and in view of the discussion above on the effect of intensity, dose, monomer concentration, degree of conversion, and chain transfer agent on the intrinsic viscosity of the polymer. Accordingly, the reaction conditions which may be used to prepare a water-soluble polymer having an intrinsic viscosity different from the intrinsic viscosities of the polymers described in Table 1, may be readily determined by minor modification of the reaction conditions given in Table 1 for the preparation of the polymer having the intrinsic viscosity nearest to the intrinsic viscosity of the polymer which is desired to be prepared. Such modification may be made in view of the discussions above on the effect of intensity, dose, monomer concentration, percent conversion of monomer to polymer, and chain transfer agent on the intrinsic viscosity of the polymer. For example, a polymer having an intrinsic viscosity of about 16 deciliters per gram may be prepared by using the same reaction conditions employed in Example F in Table 1, except that the radiation intensity is increased, the total radiation dose is increased, the monomer concentration is lowered, the percent monomer conversion is increased, and/or the reaction is carried out in the presence of a chain transfer agent. It is generally preferred, however, that the said decrease in intrinsic viscosity be obtained by increasing the radiation intensity, lowering the monomer concentration, and/or using a chain transfer agent.

The product of irradiation is an aqueous solution of the water-soluble polymer which may be in the form of a pourable liquid or a nonpourable, rubbery gel, depending upon the polymer concentration and the intrinsic viscosity of the polymer. The viscosity of the polymer solution tends to increase as the polymer concentration and intrinsic viscosity of the polymer increase. The polymer solutions produced by the radiation may be admixed with water and used directly or the polymer solution may be concentrated by conventional means or it may be recovered in particulate form, e.g., dry form. For example, a nonpourable gel may be finely subdivided and the water removed by conventional drying techniques. Or, the water may be extracted from the subdivided gel with a water-miscible, volatile organic liquid which has no affinity for the copolymer, e.g., with methanol.

The copolymer is desirably compatible with reservoir fluids and reservoir rock. The polymer may contain cations which are preferably monovalent cations and more preferably sodium.

The polymers obtained from this radiation polymerization generally have relatively low Huggins constants. This constant is related to the linearity of the polymer where molecular weights are constant, i.e., for two copolymers having similar molecular weights but different Huggins constants, the lower Huggins constant indicates a more linear polymer. Polymers having Huggins constants below 1 and preferably below 0.7 and more preferably below 0.5 are most often used with this invention. In certain applications, a mixture of polymers having low, medium, and/or high Huggins constants may be desired to obtain improved oil recovery. A more detailed definition of Huggins constant and method for determining Huggins constant of a polymer is found in "Textbook of Polymer Chemistry," Billmeyer, Interscience Publishers, N.Y., 1957, pp. 128–139.

It is generally desired that the copolymer not plug the reservoir rock, either by adsorption or absorption or by flocculation of clays within the reservoir or by interreaction with formation fluids. Linear polymers, i.e., those polymers exhibiting minimum or no branching, are especially useful to accomplish this objective. Also, if the copolymer is anionic in nature, maximum mobility imparting characteristics with minimum flocculation are generally achieved.

Intrinsic viscosity of the polymer can vary from less than about 1 to about 60 deciliters per gram and preferably is about 5 to about 35 deciliters per gram. The permeability of the reservoir rock to be flooded will greatly influence the desired intrinsic viscosity, but, generically speaking, a lower permeability reservoir rock demands lower intrinsic viscosities. For example, permeabilities less than about 50 md will generally demand intrinsic viscosities less than about 10, whereas permeabilities of about 200 md or more will generally demand intrinsic viscosities up to and greater than about 20 for improved results. The intrinsic viscosity numbers referred to are measured in a 2 normal sodium chloride solution at 25.5°C. Of course, copolymers having very high intrinsic viscosities can "plug" or "bridge" pore holes in reservoir rock; such may be desired in heterogeneous reservoirs. However, it can be generally concluded that the effectiveness of the polymer increases as the intrinsic viscosity increases, providing the degree of branching does not substantially increase and the polymer does not plug the reservoir rock. Mixtures of polymers having different intrinsic viscosities may also be used. Where the reservoir is characteristic of a very permeable reservoir, i.e., permeabilities in excess of 1 darcy, the intrinsic viscosity is desirably greater than 25 deciliters per gram.

The polymer may be solubilized and diluted to the desired concentration with water. The use of water containing large amounts of polyvalent metal ions which have an adverse effect on the viscosity of the polymer solution or on the water-solubility of the polymer is preferably avoided. The amount of polyvalent metal ions which may be present in the aqueous polymer solution is dependent upon the specific polyvalent metal ion present, the temperature and pH of the solution, and the intrinsic viscosity and anionic content of the polymer. In general, the polymer becomes less tolerant of polyvalent metal ions as the intrinsic viscosity, anionic content, and concentration of the polymer increases. The use of water containing substantial amounts of copper ions and/or iron ions is preferably avoided due to the adverse effect such ions may have on the water-solubility of the polymer, etc. Where maximum viscosity is desired for a given polymer concentration, the water preferably contains less than about 500 ppm TDS (Total Dissolved Solids), i.e., the water is classified as "soft" water. Also, where maximum viscosities are desired, the water preferably contains less than about 50 ppm of divalent cations, such as calcium and/or magnesium. Shearing of the polymer upon dissolution and injection into the reservoir should be avoided if maximum viscosity is desired. To obtain maximum viscosity with the gel form of the polymer, the gel is first extruded and then cut into fine pieces, e.g., the size of BBs, and thereafter agitated in an aqueous solution at low shear rates. Pumps characteristic of low shear rates as well as agitators run at low shear rates are especially useful. Water-soluble alkaline salts, that is, salts which give pH above 7 in water, such as alkali metal carbonates, may be added to the aqueous solution to facilitate solubilization of the polymer. A preferred alkaline salt is sodium carbonate. The amount of alkaline salts added to the water must be carefully controlled if one desires to avoid hydrolysis of the polymer. Other additives known to the art are also useful.

The polymer can be injected in the front portion of a waterflood or an aqueous polymer solution can follow a conventional displacing slug. If the injectivity profile of an injection well is to be improved, the polymer solution precedes the normal oil recovery process, e.g., a displacing slug. Volume amounts of less than about 5 percent to about 70 percent or more pore volume are preferred where the polymer is injected behind a displacing slug. In normal waterflooding operations, volume amounts up to about 2 or more pore volumes are useful. To obtain economical mobility control, the polymer concentration can be graded from a high at the front portion of the polymer slug to a low concentration near the back portion of the polymer slug. Such designs are known in the art, e.g., U.S. Pat. No. 3,467,187 to Gogarty et al. In addition, the polymer can be "spiked," i.e., present in a very large concentration, in the front portion of the aqueous polymer slug and thereafter followed by water containing less or a minimum polymer concentration, e.g., 10 percent pore volume containing 1,200 ppm (U.S. Pat. No. 3,605,892 to Gogarty et al.) followed by 20 percent or more pore volume containing 250 ppm.

Where a displacing slub is used in conjunction with the polymer, the displacing slug can be a miscible, miscible-like or immiscible displacing slug. Examples of preferred displacing slugs include those defined in U.S. Pat. No. 3,254,714 to Gogarty et al.; U.S. Pat. No. 3,497,006 to Jones et al.; U.S. Pat. No. 3,506,070 and 3,506,071 to Jones; U.S. Pat. Nos. 3,330,344 and 3,348,611 to Reisberg; U.S. Pat. No. 3,126,952 to Jones; U.S. Pat. No. 3,163,214 to Csaszar; U.S. Pat. No. 3,354,953 to Morse; U.S. Pat. No. 3,373,809 to Cooke, Jr.; U.S. Pat. No. 3,126,952 to Jones; U.S. Pat. No. 3,302,713 to Ahearn et al.; and U.S. Pat. No. 3,512,586 to Holm. Other types of displacing slugs known in the art are also useful with this invention.

The aqueous polymer solution can contain additives to impart desired characteristics to the oil recovery process. For example, salts, surfactants, alcohols, pH control, oxygen scavenging agents, corrosion inhibitors, biocides, sequestering agents, antioxidants, viscosity stabilizers, solution stabilizers, and other like agents can be incorporated into the aqueous polymer solution. In general, any component can be added to the aqueous polymer solution as long as the component is compatible with the polymer and will not impart an overriding detrimental influence to the flooding process within the reservoir. A specific application is to add the polymer to the water phase of an emulsion or micellar dispersion.

The following examples are presented to teach specific working embodiments of the invention, such are not meant to limit the interpretation of the invention. Unless otherwise specified, all percents are based on volume.

Preparation of the Copolymers

Polymers used for testing are prepared with cobalt 60 gamma radiation, radiation intensities and dosages are outlined in Table 1. The process for preparing Polymer A is explained, preparation of the other polymers is similar except for Table 1 indicated variations.

To 24,000 grams of deionized water there is added 692 grams of sodium hydroxide. After cooling the solution to 30°C., 1,250 grams of acrylic acid is added. Thereafter, 5,000 grams of acrylamide are added while mixing and the pH is adjusted to 9.4. The resulting solution contains 75 percent by weight acrylamide (AAd) and 25 percent by weight sodium acrylate (NaAA) and has a total monomer concentration of 21.4 percent by weight. The solution is purged with $N_2$ for 20 minutes and thereafter sealed. The sample is irradiated with cobalt 60 gamma radiation at an intensity of 18,000 rads/hr. (R/hr.) to a total dose of 8,800 rads (R). The resulting product is a gel-like mass.

A portion of the gel is weighed, and thereafter extracted with methanol to precipitate the polymer. The polymer is dried in a vacuum oven at 36°C. and 0.02 psi for 24 hours and then to constant weight of 110°C. Weight of the dried product divided by the theoretical weight gives a monomer conversion of 93 percent.

A portion of the gel is solubilized in water by first extruding it through a "meat" grinder, the "spaghetti"-like extrusion is cut into "BB" size particles and then dissolved in water by agitating at a low rpm to prevent substantial shearing of the polymer.

The residue of the gel is recovered in dry powder form by first extruding the gel, then dissolving it in water and thereafter adding methanol to precipitate the polymer out of the solution. The polymer is then ground to less than 20 mesh size and finally dried at 60°C. in a vacuum oven.

The intrinsic viscosity is measured at 25.5°C. in a 2 normal NaCl aqueous solution. The Huggins constant is measured by the method described in "Textbook of Polymer Chemistry," Billmeyer, Interscience Publishers, New York, 1957, pp. 128–139.

The monomer used in Sample "G" is dissolved in water containing 9.1 percent by weight of methanol.

TABLE 1

INFORMATION ON POLYMER SAMPLES

| Polymer | AAd/NaAA Wt. Ratio | Monomer Concentration (%) | pH | Intensity (R/hr.) | Total Dose (R) | Additive (%) | Monomer Conversion (%) | Intrinsic Viscosity Gel (dl/g) | Intrinsic Viscosity Powder (dl/g) | Huggins Constants Gel | Huggins Constants Powder |
|---|---|---|---|---|---|---|---|---|---|---|---|
| A | 75/25 | 21 | 9.4 | 18,000 | 8,800 | — | 93 | 23.7 | 23.0 | — | 0.19 |
| B | 70/30 | 21 | 9.4 | 20,000 | 9,800 | — | 93 | 22 | 20 | 0.19 | 0.19 |
| C | 60/40 | 22 | 9.4 | 20,000 | 10,300 | — | 93 | 23.0 | 23.0 | — | — |
| D | 70/30 | 30 | 9.5 | 230,000 | 50,000 | — | 91 | 14 | 12.8 | — | 0.38 |
| E | 70/30 | 40 | 9.5 | 10,000 | 1,760 | — | 34 | 39.4 | 33 | 0.06 | — |
| F | 70/30 | 24 | 9.5 | 100,000 | 15,000 | — | 86 | 18.5 | — | 0.24 | — |
| G | 70/30 | 27 | 9.5 | 20,000 | 11,500 | MeOH 9.1 | 91 | 12.4 | 11.7 | 0.31 | 0.38 |
| H | 70/30 | 13 | 9.5 | 220,000 | 44,000 | MeOH 15 | 96.5 | 1.0 | — | — | — |
| I | 70/30 | 13 | 9.5 | 220,000 | 44,000 | — | 96.5 | 5.8 | — | 0.64 | — |
| J | 70/30 | 25 | 9.5 | 220,000 | 44,000 | MeOH 15 | 84.0 | 6.9 | — | 0.52 | — |
| K | 70/30 | 24 | 9.5 | 20,000 | 7,667 | — | 86.7 | 28.2 | — | 0.13 | — |
| L | 70/30 | 30 | 9.5 | 20,000 | 2,667 | — | 54 | 31.0 | — | 0.04 | — |
| M | 90/10 | 40 | 9.6 | 10,000 | 1,350 | — | 24 | 53 | — | Less than 0.02 | — |

Flooding Data

EXAMPLE I

Core samples taken from a sandstone formation are first flushed with toluene, then dried in a vacuum. Permeability of the cores is between 100 and 200 md. The cores are then encapsulated in plastic, except for the ends. The polymers are dissolved in water containing Table 2 indicated ppm of TDS and are then filtered through a 200 mesh screen to remove any large particles. They are then injected into the cores. The initial and flushed permeabilities are measured with water containing about 500 ppm of TDS. Reciprocal mobilities are measured after 10 pore volumes of polymer solution is injected. Table 2 shows the results:

so with the polymer III. Polymer III is a commercially available, partially hydrolyzed, very high molecular

TABLE 2

RESULTS OF POLYMER FLOODING IN 100–200 md SANDSTONE CORES

| Run | Polymer | Brookfield Viscosity at 6 rpm (cp) | Initial Permeability (md) | | Reciprocal Mobility at 10 ft/day (cp) | | Flushed Permeability (md) | | Permeability Reduction | |
|---|---|---|---|---|---|---|---|---|---|---|
| | | | Front | Rear | Front | Rear | Front | Rear | Front | Rear |
| 1 | A | 26.7 | 107 | 142 | 167 | 90 | 0.5 | 1.7 | 213 | 82 |
| 2 | B | 32.2 | 142 | 145 | 140 | 109 | 1.5 | 2.6 | 93 | 56 |
| 3 | C | 27.2 | 132 | 112 | 132 | 103 | 0.9 | 1.5 | 150 | 78 |
| 4 | D | 20.0 | 110 | 125 | 149 | 72 | 0.6 | 2.4 | 178 | 52 |
| 5 | B | 8.8 | 159 | 158 | 117 | 57 | 1.3 | 3.9 | 124 | 41 |
| 6 | B | 7.1 | 97 | 154 | 92 | 55 | 0.7 | 5.2 | 143 | 30 |
| 7 | Polymer I | 16.3 | 135 | 129 | 65 | 36 | 2.5 | 7.8 | 54 | 16 |
| 8 | Polymer II | 20.0 | 145 | 154 | 166 | 49 | 0.3 | 10.2 | 454 | 15 |

Runs 1–4 and 7–8 contain 700 ppm polymer dissolved in water containing about 500 ppm of TDS.
Run 5 contains 300 ppm polymer dissolved in water containing about 500 ppm of TDS.
Run 6 contains 700 ppm polymer dissolved in water containing 18,000–20,000 TDS.

Runs 1 through 6, as compared to Runs 7 and 8, exhibit higher rear to front section reciprocal mobility and larger rear section permeability reductions. Runs 7 and 8 are made with commercially available, partially hydrolyzed, high molecular weight polyacrylamides. Polymer I has an anionic content of about 30 percent, an intrinsic viscosity of about 12.7 in 2 normal sodium chloride solution at 25.5°C., and a Huggins constant of about 0.56. Polymer II has an anionic content of about 30 percent, an intrinsic viscosity of 15.1 in 2 normal sodium chloride solution at 25.5°C., and a Huggins constant of about 0.26.

EXAMPLE II

Sandstone cores having permeabilities of about 500 to about 1,500 md are treated the same as in Example I. They are then flooded with a 700 ppm aqueous solution of the indicated polymer, and the results are indicated in Table 3:

TABLE 3

RESULTS OF POLYMER FLOODING IN 500–1500 md SANDSTONE CORES

| Run | Polymer | Brookfield Viscosity at 6 rpm (cp) | Initial Permeability (md) | | Reciprocal Mobility at 10 ft/day (cp) | |
|---|---|---|---|---|---|---|
| | | | Front | Rear | Front | Rear |
| 1 | B | 32.3 | 1345 | 1401 | 80 | 77 |
| 2 | E$^{(1)}$ | 43.5 | 789 | 736 | 272 | 240 |
| 3 | E$^{(2)}$ | 39.4 | 620 | 617 | 331 | 296 |
| 4 | Polymer III | 30.1 | 549 | 571 | 436 | 242 |

$^{(1)}$Polymer solution prepared by diluting the gel product with water.
$^{(2)}$Polymer solution prepared by dissolving polymer powder in water.

The reciprocal mobilities for polymers of this invention in front and rear core sections are nearly equal but not so with the polymer III. Polymer III is a commercially available, partially hydrolyzed, very high molecular weight polyacrylamide having an intrinsic viscosity of about 20.1 in 2 normal sodium chloride solution at 25.5°C. and a Huggins constant of about 0.16.

EXAMPLE III

Runs 3 and 4 in Table 3 are plotted on a graph, reciprocal mobilities on the ordinate vs. pore volume injections for the front and rear sections of the cores.

Figure 2:
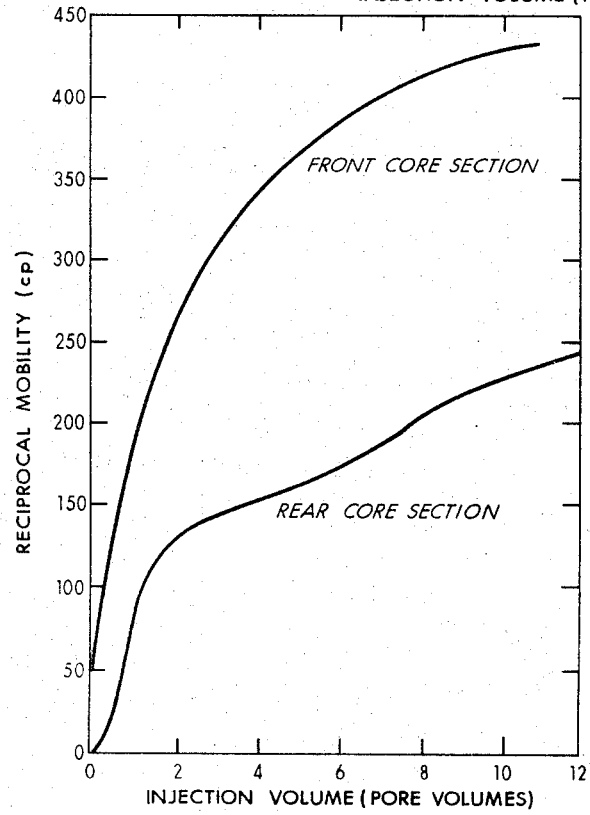

Polymer E (Run 3) is plotted in FIG. 1 to show the front and rear core section reciprocal mobilities are substantially equal and constant after six pore volumes. FIG. 2 shows that the reciprocal mobilities of polymer III (Run 4) for the front and rear core sections are widely spread and continually increasing during pore volume injections. The stable mobilities as shown in FIG. 1 can only occur after permeability reduction has been completed. The increasing reciprocal mobilities as shown in FIG. 2 indicate a continual mobility reduction; this is undesirable for secondary and tertiary oil recovery proceses.

EXAMPLE IV

To show that the copolymers of this invention are effective to recover oil from highly permeable reservoirs, this example is presented.

Tubes 2 inches in diameter by 6 inches long are packed with Ottawa White Sand (grain size between 60 and 200 mesh) wetted in water. The tube is continually vibrated to facilitate packing. Sintered metal disks are used to enclose the ends and pressure taps are located along the tube. Absolute permeabilities of the packs are 4–6 darcies and porosities about 35 percent. The sandpacks are flooded with Table 4 indicated oils (viscosities measured at 23°C.) to irreducible water saturation and then the packs are either flooded with 1.1 pore volumes of water or 1.1 pore volumes of aqueous polymer solution. Thereafter, the packs are flushed with 1.1 pore volumes of water. The results are indicated in Table 4:

TABLE 4

VISCOUS OIL RECOVERY IN SANDPACKS BY POLYMER FLOODING

| Flooding Medium | Initial Oil Saturation (Percent of Pore Volume) | Oil Recovery (Percent of Initial Oil in Place) | Oil Remaining (Percent of Pore Volume) | Additional Oil Recovered (Percent of Pore Volume) | Mobility Ratio Front | Mobility Ratio Rear |
|---|---|---|---|---|---|---|
| 210 to 225 cp oil | | | | | | |
| Water | 86.2 | 45.0 | 47.4 | — | 28.5 | 10.6 |
| 250 ppm Polymer II | 86.4 | 66.8 | 28.7 | 18.7 | 1.2 | 1.6 |
| 250 ppm Polymer III | 87.8 | 68.4 | 27.8 | 19.6 | 0.56 | 1.04 |
| 125 ppm of Polymer E | 87.6 | 71.0 | 25.4 | 22.0 | 0.45 | 0.74 |
| 250 ppm of Polymer E | 87.9 | 75.0 | 21.9 | 25.5 | 0.45 | 0.45 |
| 1140 cp oil | | | | | | |
| Water | 88.3 | 31.8 | 60.2 | — | 32.3 | 15.2 |
| 250 ppm of Polymer E | 90.1 | 68.1 | 28.8 | 31.4 | 3.2 | 1.6 |
| 250 ppm of Polymer III | 88.4 | 59.8 | 35.6 | 24.6 | 7.9 | 3.2 |

The total fluid and water production are measured; oil production is the difference between the two.

The additional oil recovered is the difference in oil recovered after waterflooding and polymer flooding, i.e., such as the incremental oil recovered over a waterflood. Water saturations before flooding are 12–14 percent of the pore volume for the 200 cp. oil and 10–12 percent for the 1,120 cp. oil. As noted in the Table, copolymers of the invention recovered about 30 percent more of the 220 cp. oil than prior art polymers when used at the same concentration level and about 10 percent more of the 220 cp. oil when used at one-half the concentration.

For the 1,140 cp. oil, copolymers of this invention recovered about 27 percent more oil than the polymer III. Mobilities of the flooding media are obtained after 1.1 pore volumes injection and are dependent upon the oil saturation of the sandpack. The permeability of water and, therefore, the mobility of the aqueous flooding media rapidly increase as oil saturations decrease. The mobility ratio is defined as the mobility of the displacing fluid divided by the mobility of the displaced fluid; thus, a mobility ratio greater than 1 indicates an unfavorable displacement. For the 210–225 cp. oil recovery, copolymers of this invention exhibited favorable displacement whereas for polymers II and III, the mobility ratio is slightly unfavorable. Both polymers, however, had an unfavorable mobility ratio when displacing the 1,140 cp. oil; but, the mobility ratio of the copolymers of the invention are about 50 percent of that of the polymer III and hence are more effective.

EXAMPLE V

To compare copolymers of this invention with copolymers of the prior art, core floods in consolidated sandstone cores (1 inch diameter by 3 inches long) are conducted. The cores are prepared by first flushing them with toluene, then drying them in a vacuum. They are then flooded with water containing about 500 ppm of TDS. About 10 pore volumes of the indicated polymer solutions are injected at frontal velocities of 10 and 1 feet/day and then the cores are flushed with water at 10 feet/day (the water contains about 500 ppm of TDS). Injected and produced polymer concentrations are analyzed to obtain polymer loss. Results of the flooding are shown in Table 5:

TABLE 5

CORE FLOODING RESULTS

| Polymer Solution | Initial Permeability (md) Front | Initial Permeability (md) Rear | Reciprocal Mobility (cp) at FV = 10 ft/day* Front | Reciprocal Mobility (cp) at FV = 10 ft/day* Rear | Reciprocal Mobility (cp) at FV = 1 ft/day* Front | Reciprocal Mobility (cp) at FV = 1 ft/day* Rear |
|---|---|---|---|---|---|---|
| 250 ppm of Polymer F | 128 | 149 | 42 | 41 | 72 | 57 |
| 300 ppm Polymer IV** | 133 | 143 | 72 | 40 | 270 | 47 |
| 250 ppm Polymer V*** | 143 | 163 | 38 | 32 | 70 | 32 |

*At 8.0 PV Injection
FV = Frontal Velocity
** Commercially available anionic acrylamide copolymer obtained by chemically catalyzed polymerization reaction. The copolymer has an intrinsic viscosity of about 12.5 dcl/gm. in 2 normal sodium chloride solution at 25.5°C. and a Huggins constant of about 0.34.
*** A very high molecular weight strongly anionic copolymer of acrylamide obtained by chemically catalyzed polymerization reaction. The copolymer has an intrinsic viscosity of about 19.8 in 2 normal sodium chloride solution at 25.5°C. and a Huggins constant of about 0.20.

Figure 3:
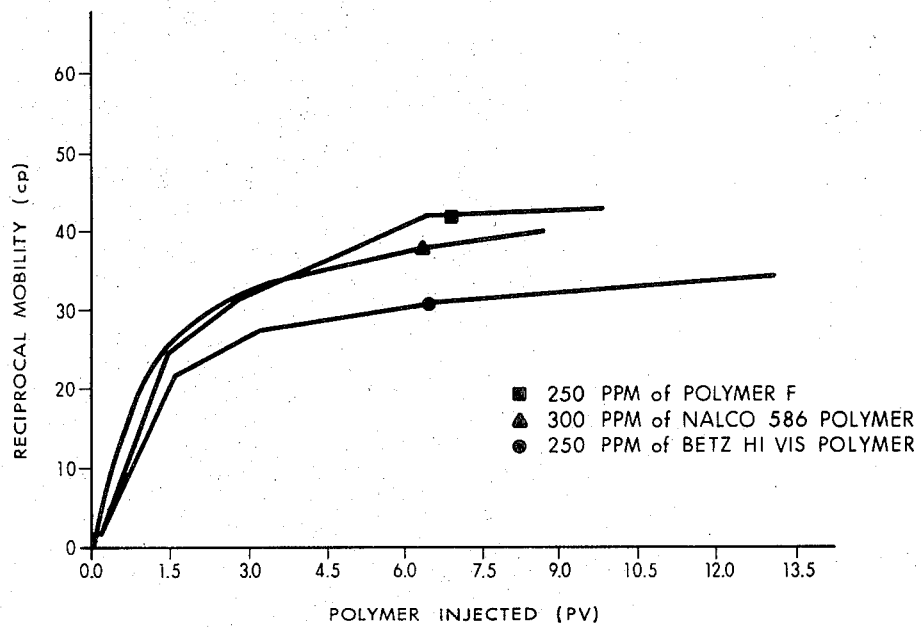
FIG. 3 graphically shows the results of core flooding using copolymers of the present invention as compared to two prior art copolymers.

Rear section reciprocal mobilities vs. pore volumes of injected copolymer solutions are plotted for the above three floods. As FIG. 3 shows, the copolymer of this invention has the highest rear section reciprocal mobilities at about equal concentrations. The copolymers of this invention give the most uniform reciprocal mobilities and permeability reduction through the core.

What is claimed is:

1. A process for recovering hydrocarbon from a subterranean reservoir having an injection means in fluid communication with a production means, the process comprising injecting into the subterranean reservoir an aqueous solution comprised of a water-soluble polymer obtained by high energy ionizing radiation polymerization of at least one monomer selected from the group consisting of acrylamide and methacrylamide and at least one monomer selected from the group consisting of acrylic acid, methacrylic acid, alkali metal acrylate, and alkali metal methacrylate in concentrations of about 10 percent to about 60 percent by weight dissolved monomer in an aqueous medium, the radiation intensity is about 250 to about 1,000,000 rads/hr. and the radiation dose is from about 500 rads to about 300,000 rads, and displacing the polymer toward the production means to recover crude oil therethrough.

2. A process of claim 1 wherein one of the monomers is acrylic acid.

3. A process of claim 1 wherein one of the monomers is methacrylic acid.

4. A process of claim 1 wherein one of the monomers is sodium acrylate.

5. A process of claim 1 wherein one of the monomers is sodium methacrylate.

6. A process of claim 1 wherein one of the monomers is acrylamide.

7. A process of claim 1 wherein the polymer is a copolymer obtained by copolymerizing acrylamide and sodium acrylate.

8. A process of claim 1 wherein the radiation intensity is within the range of about 1,000 to about 300,000 rads/hr.

9. A process of claim 1 wherein the radiation dose is within the range of about 1,000 to about 100,000 rads.

10. A process of claim 1 wherein the aqueous medium is at a pH within the range of about 3 to about 13.

11. A process of claim 1 wherein the pH of the aqueous medium is within the range of about 8 to about 11.

12. A process of claim 1 wherein the aqueous medium contains from about 25 percent to about 99 percent of acrylamide and from about 1 percent to about 75 percent of sodium acrylate.

13. A process of recovering crude oil from a subterranean reservoir having an injection means in fluid communication with a production means, the process comprising injecting into the reservoir an aqueous solution comprised of a water-soluble copolymer obtained by radiation polymerization of an aqueous solution comprised of about 10 percent to about 60 percent of a mixture of about 45 percent to about 85 percent acrylamide and from about 15 percent to about 55 percent sodium acrylate, the radiation intensity being within the range of about 5,000 to about 200,000 rads/hr. and the radiation dose being within the range of about 1,500 rads to about 50,000 rads, and displacing the copolymer toward the production means to recover crude oil therethrough.

14. A process of claim 13 wherein the copolymer obtained from the radiation polymerization is in the form of a gel.

15. A process of claim 13 wherein the radiation is gamma radiation.

16. A process of claim 13 wherein the sodium acrylate is present in a concentration of about 20 percent to about 50 percent.

* * * * *